US006372879B1

(12) United States Patent
Dowling et al.

(10) Patent No.: US 6,372,879 B1
(45) Date of Patent: Apr. 16, 2002

(54) POLYESTER POLYCONDENSATION WITH CATALYST AND A CATALYST ENHANCER

(75) Inventors: Conor M. Dowling, Blue Bell; Bin Chen, Wayne; Sri R. Seshadri, Holland, all of PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/895,990

(22) Filed: Jun. 29, 2001

Related U.S. Application Data

(63) Continuation-in-part of application No. 09/747,115, filed on Dec. 22, 2000, now Pat. No. 6,258,925.
(60) Provisional application No. 60/175,006, filed on Jan. 7, 2000.

(51) Int. Cl.$^7$ .......................... C08G 63/02; B01J 31/00
(52) U.S. Cl. .................. 528/279; 528/275; 528/285; 528/308.1; 528/308.3; 502/103; 502/113; 502/118; 502/161; 502/170
(58) Field of Search .................. 528/275, 279, 528/285, 308.1, 308.3; 502/113, 118, 161, 170

(56) References Cited

U.S. PATENT DOCUMENTS

| | | |
|---|---|---|
| 3,907,754 A | 9/1975 | Tershansy et al. |
| 3,951,886 A | 4/1976 | Miyake et al. |
| 4,238,593 A | 12/1980 | Duh |
| 4,245,086 A | 1/1981 | Uno et al. |
| 4,356,299 A | 10/1982 | Cholod et al. |
| 5,198,530 A | 3/1993 | Kyber et al. |
| 5,714,570 A | 2/1998 | Kim et al. |
| 5,866,710 A | 2/1999 | Ridland et al. |
| 5,874,517 A | 2/1999 | Huang et al. |
| 5,902,873 A | 5/1999 | Banach et al. |
| 5,981,690 A | 11/1999 | Lustig et al. |
| 6,034,203 A | 3/2000 | Lustig et al. |
| 6,066,714 A | 5/2000 | Putzig et al. |
| 6,133,404 A | 10/2000 | Kang et al. |
| 6,143,837 A | 11/2000 | Al Ghatta et al. |
| 6,166,170 A | 12/2000 | Putzig |

FOREIGN PATENT DOCUMENTS

| | | |
|---|---|---|
| EP | 0290287 A2 | 9/1988 |
| EP | 0699700 A2 | 3/1996 |
| JP | 4213030 | 7/1967 |
| JP | 6128464 | 5/1994 |
| WO | WO97/47675 | 12/1997 |
| WO | WO99/28033 | 6/1999 |
| WO | WO00/71252 A1 | 11/2000 |

OTHER PUBLICATIONS

Wilfong, R. E., "Linear Polyesters," Journal of Polymer Science, 1st ed., Dacron Research Laboratory, E.I. du Pont de Nemours & Company, Inc. (Kinston, North Carolina), p. 385–440, (Sep. 12, 1961).

Francesco Pilati, "Polyesters," Synthesis by Step Polymerization, No. 17, p. 275–315, (1989).

Primary Examiner—Samuel A. Acquah
(74) Attorney, Agent, or Firm—Nicholas J. DeBenedicts

(57) ABSTRACT

The present invention is based upon the discovery that nontitanyl oxalates can enhance the catalytic functionality of titanyl oxalate catalysts. This invention provides a novel catalytic composition containing a titanyl oxalate catalyst and a metallic oxalate catalyst enhancer and optionally containing a metallic cocatalyst such as an antimony based catalyst. A synergistic relationship has been discovered between titanyl oxalate catalyst and the catalyst enhancer. A synergistic relationship has also been discovered between the titanyl oxalate catalyst, catalyst enhancer and a metallic cocatalyst such as antimony oxide or antimony triacetate. Also provided is an improved process of producing polyester by the polycondensation of polyester forming reactants in the presence of a catalytically effective amount of a polycondensation catalyst, wherein the improvement comprises utilizing, as the polycondensation catalyst, the novel catalyst composition containing a titanyl oxalate such as lithium titanyl oxalate and a catalyst enhancer such as a nontitanyl metallic oxalate like lithium oxalate and optionally containing a metallic catalyst such as antimony oxide or antimony triacetate. The improved process produces an improved polyester having lower acetaldehyde numbers and good color. The titanyl oxalate/catalyst enhancer composition can be used as a polycondensation catalyst in combination with other catalysts to achieve synergistic catalytic activity. Preferred is a combination of lithium or potassium titanyl oxalate, $Li_2$ or $K_2TiO(C_2O_4)_2$, lithium or potassium oxalate, $Li_2$ or $K_2(C_2O_4)_2$ with antimony oxide or antimony triacetate or antimony trisglycoxide.

31 Claims, No Drawings

POLYESTER POLYCONDENSATION WITH CATALYST AND A CATALYST ENHANCER

REFERENCE TO RELATED APPLICATION

This application is a continuation-in-part of U.S. patent application Ser. No. 09/747,115, filed Dec. 22, 2000, now U.S. Pat. No. 6,258,925, which claims priority of U.S. Provisional Application No. 60/175,006, filed Jan. 7, 2000, which disclosures are incorporated herein by reference.

BACKGROUND OF THE INVENTION

This invention relates to synergistic combinations of titanium containing catalysts and catalyst enhancers of carboxylic acid or oxalic acid or their Li, Na, K, Rb. Cs, Be, Mg, Ca, St, Ba and ammonium salts that are useful for manufacturing polyesters. The synergistic combination of the titanium containing catalysts with a catalyst enhancer such as an oxalic acid, an oxalic acid salt or a carboxylic acid or a carboxylic acid salt provides fast reactions with improved properties such as reduced acetaldehyde content and good color properties for the resulting polyester at substantially reduced catalyst levels.

DESCRIPTION OF THE PRIOR ART

Polycondensation reactions that produce polyesters require an extremely long period of time that is significantly reduced by a suitable catalyst. Various types of catalysts are used to shorten the reaction time. For example, antimony trioxide, antimony triacetate and antimony trisglycoxide are generally used as polycondensation catalysts.

Titanyl oxalate compounds have been suggested as catalysts for polycondensation reactions to produce polyesters. However, titanyl oxalate catalysts when used as polycondensation catalysts for polyesters have caused color problems in the resulting polyester.

Polyesters are obtained by esterification, ester interchange or polycondensation of dibasic acids such as terephthalic acid and isophthalic acid or esters thereof, functional derivatives of acid chlorides and glycols such as ethylene glycol and tetramethylene glycol or oxides thereof and functional derivatives of carbonic acid derivatives. In this case, a single polyester is obtained when one dibasic acid component and glycol component are used. Mixed copolyesters can be obtained when at least two or more types of dibasic acid component and glycol component are mixed, esterified or subjected to ester interchange and then subjected to polycondensation. When a single polyester or two or more initial polycondensates of a mixed copolyester are subjected to polycondensation, an ordered polyester is obtained. In this invention, the term polyester is a general designation for these three types.

Prior literature has disclosed titanyl oxalate compounds for use as polycondensation catalysts for polyesters. The titanyl oxalate compounds disclosed include potassium titanyl oxalate, ammonium titanyl oxalate, lithium titanyl oxalate, sodium titanyl oxalate, calcium titanyl oxalate, strontium titanyl oxalate, barium titanyl oxalate, zinc titanyl oxalate and lead titanyl titanate. However, based upon the examples in such literature references, only potassium and ammonium titanyl oxalate have actually been used to catalyze the polyester forming reaction. See for example Japanese Patent Publication 42-13030, published on Jul. 25, 1967. European Patent application EP 0699700 A2 published Mar. 6, 1996 assigned to Hoechst and entitled "Process for production of Thermostable, Color-neutral, Antimony-Free Polyester and Products Manufactured From It" discloses the use as polycondensation catalyst, however only potassium titanyl oxalate and titanium isopropylate were used for such a catalyst, and, while improved color and antimony free polyester are disclosed, cobalt or optical brighteners were also employed. Other patents have disclosed potassium titanyl oxalate as a polycondensation catalyst for making polyester such as U.S. Pat. No. 4,245,086, inventor Keiichi Uno et al., Japanese Patent JP 06128464, Inventor Ishida, M. et al. U.S. Pat. No. 3,951,886, entitled "Process of Producing Polyester Resin" of Hideo, M. et al, at column 3, line 59 to column 4, line 10, contains a disclosure of titanyl oxalate catalysts for polyesters including a listing of many types of titanyl oxalate catalyst. However, only potassium titanyl oxalate and ammonium titanyl oxalate were used in the examples and lithium titanyl oxalate was not even listed among their preferred titanyl oxalate catalysts.

Titanium based catalysts have shown very high polycondensation activity, however; the resulted polyesters are yellowish color which will limit their applications. Therefore, prior art activity has been directed towards the development of modified titanium catalysts. Titanium compounds are not a good sole catalyst. Ti requires a cocatalysts or modifiers/promoters to form composite catalyst. Titanium compounds in the general formula of $Ti(OR)_4$, $Ti^{(III)}Ti^{(IV)}_y O_{(3+4y)/2}$, $RO[Ti(OR)_2O]_n R$ have been widely claimed by others. Cocatalysts or modifiers/promoters, such as antimony compounds, tin compounds, zirconium compounds, silicon compounds, cobalt compound, aluminum compounds, alkali metal compounds, rare earth metal compounds, magnesium compounds, germanium compounds, zinc compounds, lanthanide series compounds, phosphorus compounds, halides, sulfur containing compounds, ammonia hydroxide, and amines, have been claimed together with Ti compounds.

U.S. Pat. No. 6,166,170, E. I. du Pont de Nemours and Company, issued on Dec. 26, 2000 discloses a catalyst composition of a titanium compound, a complexing agent, and an aqueous solution of hypophosphorous acid or a salt. The titanium compound has a general formula, $Ti(OR)_4$, combined with a zirconium compound, $Zr(OR)_4$. The complex agents are hydroxycarboxylic acids, alkanolamines, aminocarboxylic acids and their combinations of two or more.

U.S. Pat. No. 6,066,714, E. I. du Pont de Nemours and Company, issued on May 23, 2000, discloses an organic titanium compound, a phosphorus compound, an amine, and a solvent as a catalyst. The organic compound is $Ti(OR)_4$. The phosphorus compound is either $(RO)_x(PO)(OH)_{3-x}$ or $(RO)_y(P_2O_3)(OH)_{4-y}$. The amine is a tertiary amine. Aluminum, cobalt, antimony compounds and their combination were claimed as cocatalysts.

U.S. Pat. No. 6,034,203, E. I. du Pont de Nemours and Company, issued on Mar. 7, 2000, discloses a catalytic process that can be used in oligomerization, polymerization, or depolymerization. The catalyst has the formula of $M_x Ti^{(III)}Ti^{(IV)}_y O_{(x+3+4y)/2}$, where M is an alkali metal, such as Li; x and y are numbers greater than or equal to zero wherein if x equals zero, y is a number less than ½.

U.S. Pat. No. 5,981,690, E. I. du Pont de Nemours and Company, issued on Nov. 9, 1999. This patent shows a catalyst solution containing an organic titanate ligand, organic silicates and/or zirconates, and phosphorus compounds. Titanium has a formula of $Ti(OR)_4$; silicon and zirconium compounds can be organic ortho silicate and zirconate; phosphorus compound can be an organic phosphonic or phosphinic acid. The solvent used was ethylene glycol. The catalyst was claimed to be used in fabrication of PET, PEI, PPT, PBT, and etc.

U.S. Pat. No. 5,866,710, Tioxide Specialties Limited, issued on Feb. 2, 1999 (EP 0 812 818 A1, published on Dec. 17, 1999). A process of preparing an ester is disclosed in the presence of a catalyst and a base, the product from orthoesters and condensed orthoesters of zirconium and titanium. The orthoesters have the formula of $M(OR)_4$; the condensed orthoesters, $RO[M(OR)_2O]_nR$; where M is either zirconium or titanium. This compound can be illustrated as the following, $M(OR)_4$, if n=1

$(RO)_3MOM(OR)_3$, if n=2

$(RO)_3MOM(OR)_2OM(OR)_3$, if n=3, and etc.

The base can be selected sodium hydroxide, potassium hydroxide, ammonium hydroxide, sodium carbonate, magnesium hydroxide and ammonia.

WO 00/71252 A1, ACMA Limited, published on Nov. 30, 2000. An esterification catalyst composition was disclosed. The catalyst contains 1) hydrolysis product of orthoesters and condensed orthoesters of titanium, zirconium or aluminum; 2) an alcohol containing at least two hydroxyl groups; 3) an organophosphorus compound containing at least one P—OH group and a base; 4) a compound of germanium, antimony or tin.

WO 99/28033 A1, Tioxide Specialties, published on Jun. 10, 1999. An esterification catalyst composition was disclosed. The catalyst contains 1) hydrolysis product of orthoesters and condensed orthoesters of titanium, zirconium or aluminum; 2) an alcohol containing at least two hydroxyl groups; 3) an organophosphorus compound containing at least one P—OH group and a base.

WO 97/47675 A1, Imperial Chemical Industries PLC, published on Dec. 18, 1997 also EP 0906356 jointly with E. I. Du Pont DeNemours & Company Inc. A catalyst is disclosed that is obtained by reacting an alkyl titanate or alkyl zirconate, an alcohol, a 2-hydroxy carboxylic acid and a base. A cobalt (II) salt , a phosphorus compound, and a sodium compound were claimed as catalyst components.

U.S. Pat. No. 5,874,517, Hoechst Celanese Corporation, issued on Feb. 23, 1999. An improved low acetaldehyde process was disclosed. The process utilized mixed Ti and Sb catalysts, however; potassium titanyl oxalate was suggested as a sole catalyst (col. 6, lines 21 and 22). Potassium titanyl oxalate as a polycondensation catalyst was claimed in claims 15 to 20.

U.S. Pat. No. 5,902,873, General Electric Company, issued on May 11, 1999; (EP 0 909 774 A1, published on Apr. 21, 1999. A catalyst composition for the preparation of a polyester on copolyester is disclosed. The catalyst was composed of 1) a titanium or zirconium based compound, general formula, $Ti(OR)_4$ or $Zr(OR)_4$, the titanium compounds were water-stable; 2) a lanthanide series compound, such as lanthanum, samarium, europium, erbium, terbium, and cerium; 3) a hafnium based compound; 4) a phosphate-forming compound, such as alkali metal phosphates, alkali metal phosphates, alkali hypophosphates, and alkali metal polyphosphates. The combination of the above components was claimed. In particular, titanium oxide acetylacetonate was claimed (in claim 3, col. 13, lines 52 and 53).

U.S. Pat. No. 6,133,404, National Institute of Technology and Quality, issued on Oct. 17, 2000. A polyester and formation process is disclosed in the presence of a composite catalyst that consists of a titanium compound, a zinc compound, an antimony compound, and a phosphorous compound. This catalyst improved the rate of polyester production and properties of the polymers, in particular, biodegradability of the polymer. The titanium compound has the following general formula,

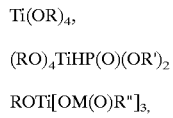

$Ti(OR)_4$, $(RO)_4TiHP(O)(OR')_2$ $ROTi[OM(O)R'']_3$, where M is selected from carbon atom, phosphorous atom, sulfur atom, and their mixtures.

The zinc compound can be zinc oxide, zinc acetate, zinc chloride, zinc hydroxide and their mixtures. An antimony compound can be selected from antimony chloride, antimony acetate, antimony oxide and their mixtures. A phosphorous compound can be one of the following, Phosphoric acid compounds, phosphite compounds, phosphonic acid compounds, phosphinic acid compound, and their mixtures.

U.S. Pat. No. 5,714,570, Korea Institute of Science and Technology, issued on Feb. 3, 1998. A method for the preparation of polyester by use of a composite catalyst was revealed. The composite catalyst consists of a compound of Sb, a compound of Ti, and a compound of Sn. A compound of Ti has a general formula of $(R_1O)_4TiHP(O)(OR_2)_2$, and Tin compound, $(R_3)_2SnX$, where X is selected from sulfur, oxygen, halogen, and a compound containing an ether, a thio or an ester bond. In particular, potassium titanium oxyoxalate was claimed as shown in claim 9 (col. 10, lines 52 and 53) other metals (such as germanium, zinc, manganese, alkali, and alkali earth) compounds were also claimed. It was disclosed that antioxidant, such as a hindered phenol, was used in the process.

U.S. Pat. No. 6,143,837, Sinco Ricerche, S.P.A, issued on Nov. 7, 2000. A process of preparation of polyester resin utilizing Ti compound catalyst was disclosed. The activity of Ti catalysts was shown to be four time higher than S21 catalyst. The titanium compounds can be selected from the group consisting of alkoxides of titanium, acetyl acetonates of titanium, dioxide of titaniun, and titanium phosphites. Silica mixed with Ti was used in their examples (but not claimed). A cobalt compound was suggested to be used as a colorants.

SUMMARY OF THE INVENTION

The present invention is based upon the discovery of a synergistic combination of a titanium containing catalyst and a catalyst enhancer. This invention provides a novel catalytic mixture comprising a titanium containing catalyst of the formula $X_mTiO(C_2O_4)_2(H_2O)_n$, where X is selected from the group consisting of H, Li, Na, K, Rb, Cs, Be, Mg, Ca, Sr, Ba, and ammonium, m=1 or 2; and a catalyst enhancer comprising oxalic acid or carboxylic acid containing 1 to 26 carbon atoms or their corresponding Li, Na, K, Rb, Cs, Be, Mg, Ca, Sr, Ba, or ammonium salt. Also provided is a novel enhanced catalyst mixture comprising a titanium compound of the formula $X_mTiY_o$ with X selected from the group consisting of: H Li, Na, K, Rb, Cs, Be, Mg, Ca, Sr, Ba and ammonium, m=1 or 2, Y is a ligand of the formula $C_aH_bO_c$, a=0 to 30, b=0 to 60, and c=1 to 10; o=2, 3, 4, and a catalyst enhancer of an oxalic acid or its corresponding Li, Na, K, Rb Cs, Be, Mg, Ca, Sr, Ba or ammonium salt. An improved three component enhanced catalyst mixture can be obtained by the addition of second catalyst to either of the above enhanced catalyst mixtures, the second catalyst being a compound containing antimony or germanium. Also provided are enhanced antimony containing catalysts comprising the mixture of an antimony containing catalyst and an enhancer of an oxalic acid or its corresponding Li, Na, K, Rb. Cs, Be, Mg, Ca, Sr, Ba or ammonium salt.

This invention also provides an improved process of producing polyester by the polycondensation of polyester forming reactants in the presence of a catalytically effective amount of a polycondensation catalyst, wherein the improvement comprises utilizing, as the polycondensation catalyst, the synergistic combination of a titanium containing catalyst and the catalyst enhancer described in the preceding paragraph. A novel polyester is also provided containing the synergistic combination of a titanium containing catalyst and the catalyst enhancer described in the preceding paragraph. The improved process produces an improved polyester having lower acetaldehyde numbers and good color. The titanium containing catalyst and catalyst enhancer composition can be used as a polycondensation catalyst in combination with other catalysts to achieve synergistic catalytic activity.

DETAILED DESCRIPTION OF THE INVENTION

The production of polyester by polycondensation of polyester forming reactants is well known to those skilled in the polyester art. A conventional catalyst for the reaction is antimony oxide. The present invention is based upon the discovery of a synergistic relationship between titanium containing catalysts and carboxylic or oxalate catalyst enhancers. The catalyst and catalyst enhancer is surprisingly superior in catalyst performance for polycondensation reactions by providing good catalyst activity at reduced catalyst loadings and superior brightness in the resulting polyester.

Reactants for forming polyesters via a polycondensation reaction are well known to those skilled in the art and disclosed in patents such as U.S. Pat. No. 5,198,530, inventor Kyber, M., et al., U.S. Pat. No. 4,238,593, inventor B. Duh, U.S. Pat. No. 4,356,299, inventor Cholod et al, and U.S. Pat. No. 3,907,754, inventor Tershasy et al, which disclosures are incorporated herein by reference. The art is also described in "Comprehensive Polymer Science, Ed. G. C. Eastmond, et al, Pergamon Press, Oxford 1989, vol. 5, pp. 275–315, and by R. E. Wilfong, J. Polym. Science, 54(1961), pp. 385–410. A particularly important commercial specie of polyester so produced is polyethylene terephthalate (PET).

In addition to catalyzing polycondensation reactions, the synergistic catalyst combinations of the present invention are effective for catalyzing esterification and transesterification reactions when used in catalytically effective amounts with reactants known to participate in esterification or transesterification reactions. A catalytically effective amount is suitable.

An improved three component enhanced catalyst composition can be obtained by the addition of second catalyst to enhanced catalyst composition defined above, the second catalyst being a compound containing antimony or germanium.

Titanium Oxalate Catalysts

Examples of titanium oxalate catalysts of the formula $X_m TiO(C_2O_4)_2(H_2O)_n$, where each X is independently selected from the group consisting of H, Li, Na, K, Rb, Cs, Be, Mg, Ca, Sr, Ba and ammonium, m=1 or 2 are well known. Titanyl oxalates comprise compounds of the formula: $X_m TiO(C_2O_4)_2(H_2O)_n$, where X is selected from the group consisting of: H, Li, Na, K, Rb, Cs, Be, Mg, Ca, Sr and Ba, m=1 or 2. Titanyl oxalates include metallic titanyl oxalates of the formula $M_2 TiO(C_2O_4)_2(H_2O)_n$ wherein each M is independently selected from potassium, lithium, sodium and cesium such as lithium or potassium titanyl oxalate and nonmetallic titanyl oxalates such as ammonium titanyl oxalate. The titanyl oxalate may be anhydrous (n=0) or contain some water of hydration, i.e. n representing the amount of water of hydration. Preferred are H, Li, Na, K, Ca, Cs and ammonium.

Carboxylic Acid or Salt

Examples of a catalyst enhancer for the titanium oxalate catalysts are a carboxylic acid containing 1 to 26 carbon atoms or its corresponding carboxylic acid salt having an anion selected from the group consisting of Li, Na, K, Rb, Cs, Be, Mg, Ca, Sr ,Ba and ammonium. As used herein, "carboxylic acid" includes dicarboxylic acid. Examples of such carboxylic acids or salts are well known and include sodium acetate, sodium propionate, sodium citrate, sodium butyrate, sodium formate, sodium fumarate, malonic acid, potassium acetate, potassium benzoate, succinic acid, glutaric acid, adipic acid, maleic acid. Preferred are potassium acetate, potassium benzoate.

Titanium Containing Catalysts

Examples of titanium containing compounds of the formula $X_m TiY_o$ with X selected from the group consisting of: H, Li, Na, K, Rb. Cs, Be, Mg, Ca, Sr, Ba and ammonium, m=0, 1, or 2, Y is a ligand of the formula $C_a H_b O_c$, a=0 to 30, b=0 to 60, and c=1 to 10; o=2, 3, 4, include: acetylacetonate (a=5, b=7, and c=2); i-propoxide (a=3, b=7, and c=1); butoxide (a=4, b=9, and c=1); bis(2,2,6,6,-tetramethy-3,5-heptanedionato), i.e. a=11, b=19, and c=2. Preferred are acetylacetonate, i-propoxide, bis(2,2,6,6,-tetramethyl-3,5-heptanedionato).

Oxalic Acid or Salt

Examples of a catalyst enhancer for said titanium containing compounds are oxalic acids or its corresponding Li, Na, K, Rb. Cs, Be, Mg, Ca, Sr, Ba, or ammonium oxalic acid. Preferred are H, Li, Na, K, Ca, Cs, and ammonium.

Antimony Containing Catalysts

Examples of antimony containing catalysts that can be added to the synergistic combination of enhanced titanium oxalate or titanium containing catalysts defined above are $Sb_2O_3$, $Sb(CH_3COO)_3$, and $Sb_2(OCH_2CH_2O)_3$.

Germanium Containing Catalysts

Examples of germanium containing catalysts that can be added to the synergistic combination of enhanced titanium oxalate or titanium containing catalysts defined above are $GeO_2$, $Ge(OC_2H_5)_4$, $Ge[OCH(CH_3)_2]_4$, $Ge(OCH_3)_4$. Preferred is $GeO_2$.

Enhanceable Antimony Containing Catalysts

Examples of antimony containing catalysts that can be enhanced with a carboxylic acid or salt or an oxalic acid or salt are $Sb_2O_3$, $Sb(CH_3COO)_3$, $Sb_2(OCH_2CH_2O)_3$.

Cocatalyst

Cocatalysts that function in combination with the titanium containing catalyst and the enhancer include antimony triacetate, $Sb(CH_3COO)_3$, antimony glycoxide, $Sb_2(OCH_2CH_2O)_3$, antimony oxide, $(Sb_2O_3)$.

An effective amount for enhancing the catalytic activity of titanyl oxalate catalysts or a titanium containing catalyst is at least about 0.1 part of enhancer per part of titanyl oxalate catalyst. Preferred is from about 0.1 part to about 100 parts enhancer per part of catalyst based upon the total weight of titanium in the catalyst.

When used in combination with an enhancer, a catalytically effective amount of titanium containing catalyst should be added to the polyester forming reactants, generally at least 0.1 part based upon the weight of titanium. Preferred is from about 1 part to about 40 parts per million of catalyst based on the weight titanium in the catalyst and the weight of the of polyester forming reactants.

When used in combination with an enhancer, a catalytically effective amount of an antimony containing catalyst should be added to the polyester forming reactants. Preferred is from about 1 part to about 240 parts per million of catalyst based on the weight antimony in the catalyst and the weight of the of polyester forming reactants. For enhancing an antimony containing catalyst, an effective amount for of an enhancer for the catalytic activity of an antimony containing catalyst is at least about 0.1 part of enhancer per part of antimony containing catalyst based the weight of antimony in said antimony containing catalyst. Preferred is from about 0.1 part to about 80 parts enhancer per part of catalyst based upon the total weight of titanium in the catalyst.

The preferred amount of a antimony or germanium containing catalyst for use in combination with the enhanced titanium oxalate or titanium containing catalyst described above is from about 0.1 parts to about 80 parts based upon the weight of titanium. Preferred is from 1 to 40 parts of antimony or germanium containing catalyst.

The catalyst and enhancer mixtures of the present invention are used to make polyester typically by first dissolving them in a solvent that is compatible with polyester forming reactants, or preferable in one of the reactants itself, such as ethylene glycol.

The synergistic performance of the catalyst enhancer in combination with one or more catalysts for a polycondensation reaction for the production of PET resin is shown by the following examples.

EXAMPLES

In a polyester polycondensation reaction, acetaldehyde (AA) is an undesirable polymerization by-product. Polymerization rate is measured as rate at which intrinsic viscosity (IV) increases during reaction. Intrinsic viscosity change is an indication of the degree of polymerization that has occurred during the reaction.

Examples 1–20 and A–G

Catalyst evaluation was performed with a 3/16 stainless steel, 2 L reactor, fitted with a ball valve at the bottom of the reactor. The vessel was equipped with 3 inlet ports, one outlet port, one thermowell port and one pressure transducer port, and was vertically stirred by an electric motor with amperage monitoring. The laboratory experimental were all conducted on a 4.0 mole scale, using as polyester forming reactants, BHET and a normal bottle resin autoclave recipe. The experimental catalysts were added at the time of BHET charging.

Bis(2-hydroxyethyl)terephthalate (BHET) and catalyst were added to the reactor and the contents blanketed with nitrogen. The mixtures were heated under reduced pressure with constant stirring. The ethylene glycol (EG) produced during the polymerization was removed and trapped. The polymerization was at 280° C., under the vacuum of typically around 1 torr. The reaction was terminated when the stirrer torque reached a level, indicated by amperage to the stirrer motor, typical for a polymer of IV ~0.6. The molten state polymer under nitrogen (containing less than 2 ppm of oxygen) blanket was discharged from the bottom ball valve and quenched into a bucket filled with cold water. ¼" diameter and 1/16" thick pellets (for color measurement) were made by filling the molten polymer in a press molder and chilled immediately in cold water.

The solution intrinsic viscosity (IV) was measured by following the ASTM D 4603 method. Acetaldehyde (AA) was measured at 150° C. using gas chromatography (GC) equipped with a headspace analyzer. The brightness (L) and yellowness (b') were determined by the Hunter Lab's instrument and method.

Twenty-seven examples were performed using the above procedure and various catalysts and catalyst enhancer amounts.

Example A catalyst—180 ppm potassium oxalate—reaction time=124 mins.

Example B catalyst—2 ppm titanium from potassium titanyl oxalate—reaction time=118 mins.

Example C catalyst—6 ppm titanium potassium titanyl oxalate—reaction time=71 mins.

Example D catalyst—25 ppm antimony from antimony (III) oxide—reaction time=122 mins.

Example 1 catalyst—2 ppm titanium from potassium titanyl oxalate+90 ppm potassium oxalate—reaction time= 111 mins.

Example 2 catalyst—90 ppm potassium oxalate+25 ppm antimony from antimony (III) oxide—reaction time=120 mins.

Example 3 catalyst—180 ppm potassium oxalate+50 ppm antimony from antimony (III) oxide—reaction time=130 mins.

Example 4 catalyst—90 ppm potassium oxalate+100 ppm antimony from antimony (III) oxide—reaction time=112 mins.

Example 5 catalyst—2 ppm titanium from potassium titanyl oxalate+90 ppm potassium oxalate+25 ppm antimony from antimony (III) oxide—reaction time=105 mins.

Example E catalyst—240 ppm antimony from antimony (III) oxide—reaction time=90 mins.

Example F catalyst—240 ppm antimony from antimony (III) oxide—reaction time=100 mins.

Example 6 catalyst—2 ppm titanium from potassium titanyl oxalate+90 ppm potassium oxalate+25 ppm antimony from antimony (III) oxide—reaction time=73 mins.

Example 7 catalyst—2 ppm titanium from potassium titanyl oxalate+90 ppm ammonium oxalate+25 ppm antimony from antimony (III) oxide—reaction time=78 mins.

Example 8 catalyst—2 ppm titanium from ammonium titanyl oxalate+90 ppm potassium oxalate+25 ppm antimony from antimony (III) oxide—reaction time=79 mins.

Example 9 catalyst—2 ppm titanium from ammonium titanyl oxalate+90 ppm ammonium oxalate+25 ppm antimony from antimony (III) oxide—reaction time=77 mins.

Example 10 catalyst—2 ppm titanium from potassium titanyl oxalate+90 ppm potassium acetate+25 ppm antimony from antimony (III) oxide—reaction time=81 mins.

Example 11 catalyst—2 ppm titanium from potassium titanyl oxalate+90 ppm potassium benzoate+25 ppm antimony from antimony (III) oxide—reaction time=72 mins.

Example 12 catalyst—2 ppm titanium from bis(2,2,6,6-tetramethy-3,5-heptanedionato) oxotitanium+90 ppm potassium oxalate+25 ppm antimony from antimony (III) oxide—reaction time=72 mins.

Example 13 catalyst—2 ppm titanium from di(i-propoxide)bis(2,2,6,6-tetramethyl-3,5-heptanedionato) titanium+90 ppm potassium oxalate+25 ppm antimony from antimony (III) oxide—reaction time=100 mins.

Example 14 catalyst—2 ppm titanium from titanium oxide acetylacetonate+90 ppm potassium oxalate+25 ppm antimony from antimony (III) oxide—reaction time=114 mins.

Example 15 catalyst—2 ppm titanium from potassium titanyl oxalate+90 ppm calcium oxalate+25 ppm antimony from antimony (III) oxide—reaction time=109 mins.

Example 16 catalyst—2 ppm titanium from potassium titanyl oxalate+45 ppm oxalic acid+25 ppm antimony from antimony (III) oxide—reaction time=108 nuns.

Example 17 catalyst—2 ppm titanium from potassium titanyl oxalate+90 ppm sodium oxalate+25 ppm antimony from antimony (III) oxide—reaction time=108 mins.

Example 18 catalyst—2 ppm titanium from lithium titanyl oxalate+50 ppm lithium oxalate+25 ppm antimony from antimony (III) oxide—reaction time=102 mins.

Example G catalyst—60 ppm germanium from germanium oxide—reaction time=149.

Example 19 catalyst—10 ppm germanium from germanium oxide+90 ppm oxalate—reaction time=130 mins.

Example 20 catalyst—2 ppm titanium from potassium titanyl oxalate+90 ppm potassium oxalate+7 ppm germanium from germanium oxide—reaction time=123 minutes.

EXAMPLE RESULTS AND DISCUSSION

Example Results and Discussion

| EXAMPLE | AMOUNT (mg) | POLY TIME (mins.) | IV | AA (ppm) | L* | b* |
|---|---|---|---|---|---|---|
| A | 185.5 | 124 | 0.252 | 66.1 | 80.3 | 3.6 |
| B | 15.4 | 118 | 0.583 | 52.9 | 76.6 | 8.3 |
| C | 46.5 | 71 | 0.583 | 42.7 | 78.4 | 7.1 |
| D | 30.8 | 122 | 0.230 | 53.7 | na | na |
| 1 | 106.4 | 111 | 0.591 | 52.6 | 76.6 | 7.7 |
| 2 | 125.9 | 120 | 0.461 | 24.4 | 68.3 | 5.8 |
| 3 | 246.8 | 130 | 0.536 | 46.1 | 80.4 | 6.5 |
| 4 | 215.6 | 112 | 0.587 | 38.3 | 77.6 | 6.0 |
| 5 | 137.0 | 105 | 0.596 | 42.4 | 81.4 | 5.3 |
| E | 298.9 | 90 | 0.593 | 34.9 | 69.9 | 5.3 |
| F | 296.7 | 100 | 0.586 | 34.3 | 70.0 | 5.9 |
| 6 | 137.2 | 73 | 0.514 | 26.8 | 79.6 | 3.4 |
| 7 | 137.6 | 78 | 0.520 | 32.4 | 77.3 | 4.7 |
| 8 | 133.6 | 79 | 0.519 | 33.8 | 80.4 | 4.1 |
| 9 | 134.2 | 77 | 0.542 | 19.4 | 78.6 | 5.6 |
| 10 | 137.1 | 81 | 0.538 | 22.0 | 78.3 | 5.3 |
| 11 | 208.9 | 72 | 0.534 | 18.2 | 75.5 | 6.1 |
| 12 | 140.7 | 72 | 0.540 | 19.9 | 66.4 | 5.2 |
| 13 | 145.5 | 100 | 0.590 | 45.6 | 65.7 | 5.2 |
| 14 | 134.3 | 114 | 0.589 | 42.9 | 71.9 | 6.8 |
| 15 | 137.9 | 109 | 0.597 | 42.9 | 78.3 | 6.2 |
| 16 | 92.7 | 108 | 0.607 | 39.7 | 76.2 | 6.9 |
| 17 | 137.5 | 108 | 0.600 | 43.0 | 80.8 | 5.0 |
| 18 | 95.7 | 102 | 0.583 | 37.7 | 80.4 | 5.9 |
| G | 89.8 | 149 | 0.586 | 43.9 | 79.9 | 5.1 |
| 19 | 106.3 | 130 | 0.494 | 41.3 | 64.9 | 3.7 |
| 20 | 117.9 | 123 | 0.583 | 42.5 | 74.1 | 8.4 |

In comparing examples A, B, C and 1, 180 ppm potassium oxalate alone produced a polymer with a IV of 0.252 after 124 minutes. Using example B as a baseline, to a polymer with a similar IV, 118 minutes were needed for 2 ppm titanium in potassium titanyl oxalate while only 71 minutes were needed for 6 ppm titanium as shown in example C. The addition of potassium oxalate to potassium titanyl oxalate enhanced the rate of polymerization as can be seen in example 1.

In comparing examples A, D, 2, 3, 4 B and F, 180 ppm potassium oxalate alone produced a polymer with an IV of 0.252 after 124 minutes, 25 ppm of antimony in antimony oxide produced a polymer with an IV of 0.230 after 122 minutes. It is shown in examples 2, 3, and 4 that the addition of potassium oxalate to antimony enhanced the polymerization rate, reduced the amount of acetaldehyde, and also increased the brightness as compared to examples E and F.

In comparing examples B and 5, using the combination of potassium titanyl oxalate, potassium oxalate, and antimony oxide, the polymerization rate was faster, the acetaldehyde concentration was lower, the resulting polymer was more brighter and less yellow.

In comparing examples 5, E and F, the three component catalyst produced more brighter and less yellow polymer than antimony oxide. It is conceivable that the rate for three components can be further enhanced and the amount of acetaldehyde in the resulting polymer can be further reduced by adjusting the composition of the three components.

In comparing examples 6 to 9, replacing potassium with ammonium in three components catalyst reduced the polymerization rate slightly. The resulting polymer by ammonium containing catalyst was slightly more yellow.

In comparing examples 5, 6, 10 to 14, different ligands such as oxalate, acetate, benzoate, bis 2,2,6,6,-tetramethy-3,5-heptanedionate, i-propoxidate, acetylacetonate have been used. The catalysts containing these ligands polymerized BHET in a comparable rate with oxalate containing catalyst. However, the polymers using catalyst containing ligands rather than oxalate were less bright and more yellow. Therefore, the oxalate embodiment of the present invention is preferred over the ligand containing embodiment of the invention.

In comparing examples 5, 15 to 18, although catalysts containing H, Li, Na, K, and Ca can polymerize BHET in a similar rate, Li containing catalyst produced the least amount of acetaldehyde in the resulting polymer and are therefore preferred.

In comparing examples G, 19 and 20, the germanium catalyst can be enhanced by potassium oxalate.

We claim:

1. A catalyst combination comprising a titanyl oxalate of the formula $X_m TiO(C_2O_4)_2(H_2O)_n$, where each X is independently selected from the group consisting of : H, Li, Na, K, Rb, Cs, Be, Mg, Ca, Sr, Ba, and ammonium m=1 or 2 and a catalyst enhancer comprising oxalic or carboxylic acid containing 1 to 26 carbon atoms or their corresponding Li, Na, K, Rb, Cs, Be, Mg, Ca, Sr, Ba or ammonium salt.

2. An enhanced catalyst comprising a titanium compound of the formula $X_m TiY_o$ X is selected from the group consisting of: H, Li, Na, K, Rb. Cs, Be, Mg, Ca, Sr, Ba and ammonium, m=1 or 2, Y is a ligand of the formula $C_a H_b O_c$, a=0 to 30, b=0 to 60, and c=1 to 10; o=2, 3, 4, and a catalyst enhancer of an oxalic acid or its corresponding Li, Na, K, Rb, Cs, Be, Mg, Ca, Sr, Ba or ammonium salt.

3. The catalyst of claim 1 further comprising an additional catalyst enhancer of a compound containing antimony or germanium.

4. The catalyst of claim 2 further comprising an additional catalyst enhancer of a compound containing antimony or germanium.

5. An enhanced catalyst combination comprising an antimony containing catalyst and a catalyst enhancer of oxalic acid or its corresponding Li, Na, K, Rb. Cs, Be, Mg, Ca, Sr, Ba or ammonium salt.

6. An enhanced catalyst combination comprising a germanium containing catalyst and a catalyst enhancer of oxalic acid or its corresponding Li, Na, K, Rb, Cs, Be, Mg, Ca, Sr, Ba or ammonium salt.

7. The catalyst combination of any of claims 1 through 4 wherein the concentration of titanium is from 0.1 to 100 ppm.

8. The combination of claim 1 wherein the catalyst enhancer is selected from the group consisting of lithium titanyl oxalate, potassium titanyl oxalate and ammonium titanyl oxalate.

9. The combination of claim 2 wherein the catalyst enhancer is selected from the group consisting of lithium oxalate, $Li_2C_2O_4$, sodium oxalate, $Na_2C_2O_4$, potassium oxalate, $K_2C_2O_4$, rubidium oxalate, $Rb_2C_2O_4$, and cesium oxalate, $Cs_2C_2O_4$.

10. The combination of claim 1 wherein the titanyl oxalate is selected from the group consisting of metallic titanyl oxalates of the formula $M_2Tio(C_2O_4)_2(H_2O)_n$ wherein each M is independently selected from the group consisting of potassium, lithium, sodium, cesium and a nonmetallic ammonium cation.

11. The combination of claim 1 wherein the catalyst enhancer is lithium oxalate and the titanyl oxalate is lithium titanyl oxalate.

12. The combination of claim 5 wherein the antimony containing catalyst is selected from the group consisting of antimony triacetate, $Sb(CH_3COO)_3$, antimony trisglycoxide $Sb_2(OCH_2CH_2O)_3$, antimony oxide ($Sb_2O_3$).

13. The combination of claim 1, wherein the catalyst enhancer oxalate comprises from 0.1 part to 80 parts by weight of the combination based upon the weight of titanium.

14. The combination of claim 2, wherein the catalyst enhancer comprises from 0.1 part to 80 parts by weight of the combination based upon the weight of titanium.

15. The combination of claim 5, wherein the catalyst enhancer comprises from 0.1 part to 80 parts by weight of the combination based upon the weight of antimony.

16. The combination of claim 6, wherein the catalyst enhancer comprises from 0.1 part to 80 parts by weight of the combination based upon the weight of germanium.

17. The combination of claim 3, wherein the enhancer comprises from 0.1 part to 80 parts by weight of the composition.

18. The combination of claim 4, wherein the enhancer comprises from 0.1 part to 80 parts by weight of the composition.

19. An improved process of producing a polyester by the catalyzed polycondensation of polyester forming reactants in the presence of a polycondensation catalyst, wherein the improvement comprises utilizing as the catalyst the combination of claim 1.

20. An improved process of producing a polyester by the catalyzed polycondensation of polyester forming reactants in the presence of a polycondensation catalyst, wherein the improvement comprises utilizing as the catalyst the combination of claim 2.

21. An improved process of producing a polyester by the catalyzed polyconidensation of polyester forming reactants in the presence of a polycondensation catalyst, wherein the improvement comprises utilizing as the catalyst the combination of claim 5.

22. An improved process of producing a polyester by the catalyzed polycondensation of polyester forming reactants in the presence of a polycondensation catalyst, wherein the improvement comprises utilizing as the catalyst the combination of claim 6.

23. An improved process of producing a polyester by the catalyzed polycondensation of polyester forming reactants in the presence of a polycondensation catalyst, wherein the improvement comprises utilizing as the catalyst the combination of claim 7.

24. An improved process of producing a polyester by the catalyzed polycondensation of polyester forming reactants in the presence of a polycondensation catalyst, wherein the improvement comprises utilizing as the catalyst the combination of claim 5.

25. An improved polyester containing the combination of claim 1.

26. The improved polyester of claim 24 wherein the catalyst combination comprises from 0.1 part to 80 parts per million of the polyester.

27. The improved polyester produced by the process of claim 19.

28. An improved polyester containing the composition of claim 2.

29. The improved polyester of claim 24 wherein the polyester is polyethylene terephthalate.

30. The combination of claim 1 dissolved in a solvent.

31. The combination of claim 30 wherein the solvent is ethylene glycol.

* * * * *